Feb. 7, 1928.
C. A. NERACHER
1,658,137
DRIVING AND CONTROLLING MECHANISM FOR MOTOR VEHICLES
Original Filed Aug. 12, 1921   5 Sheets-Sheet 2
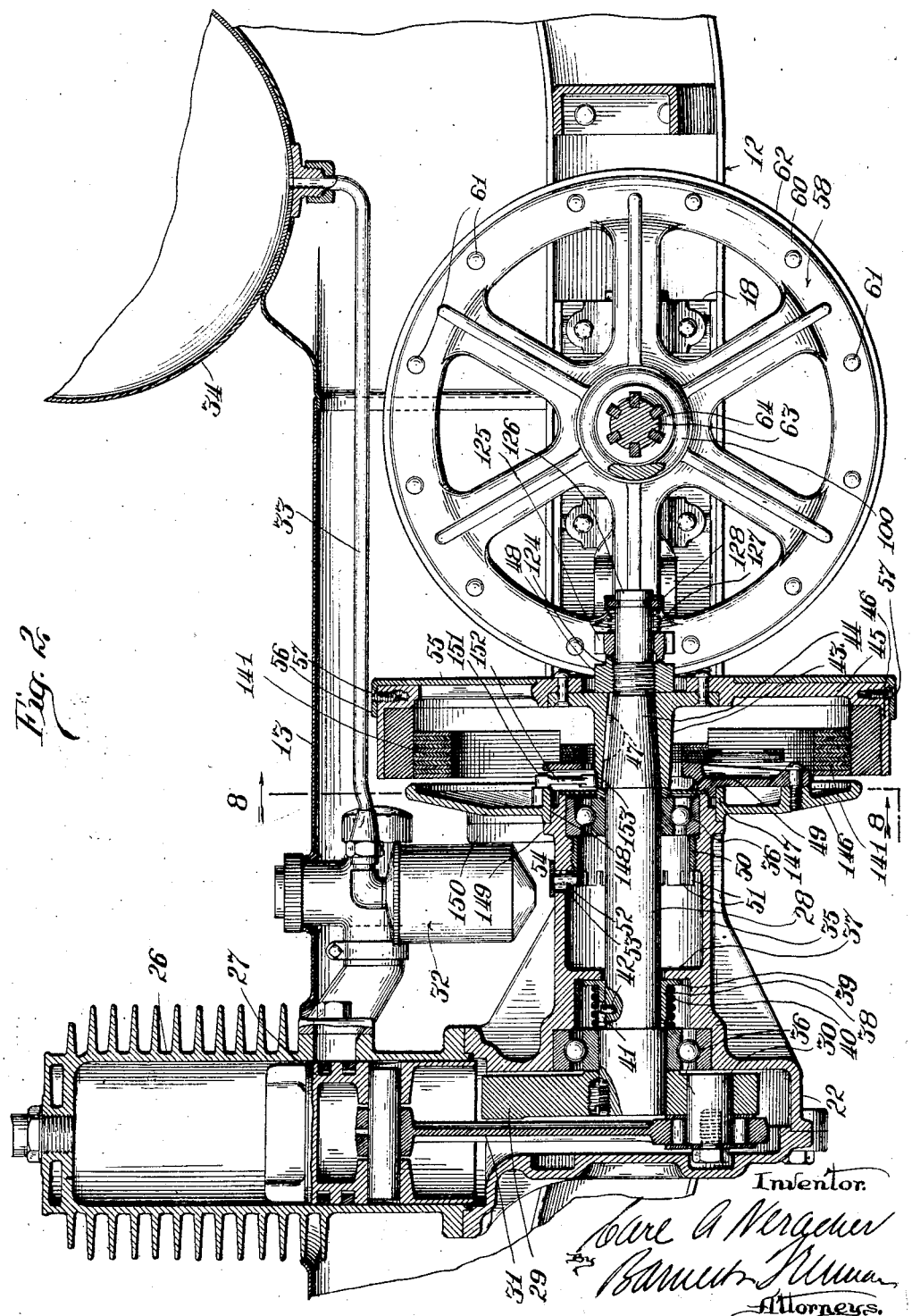

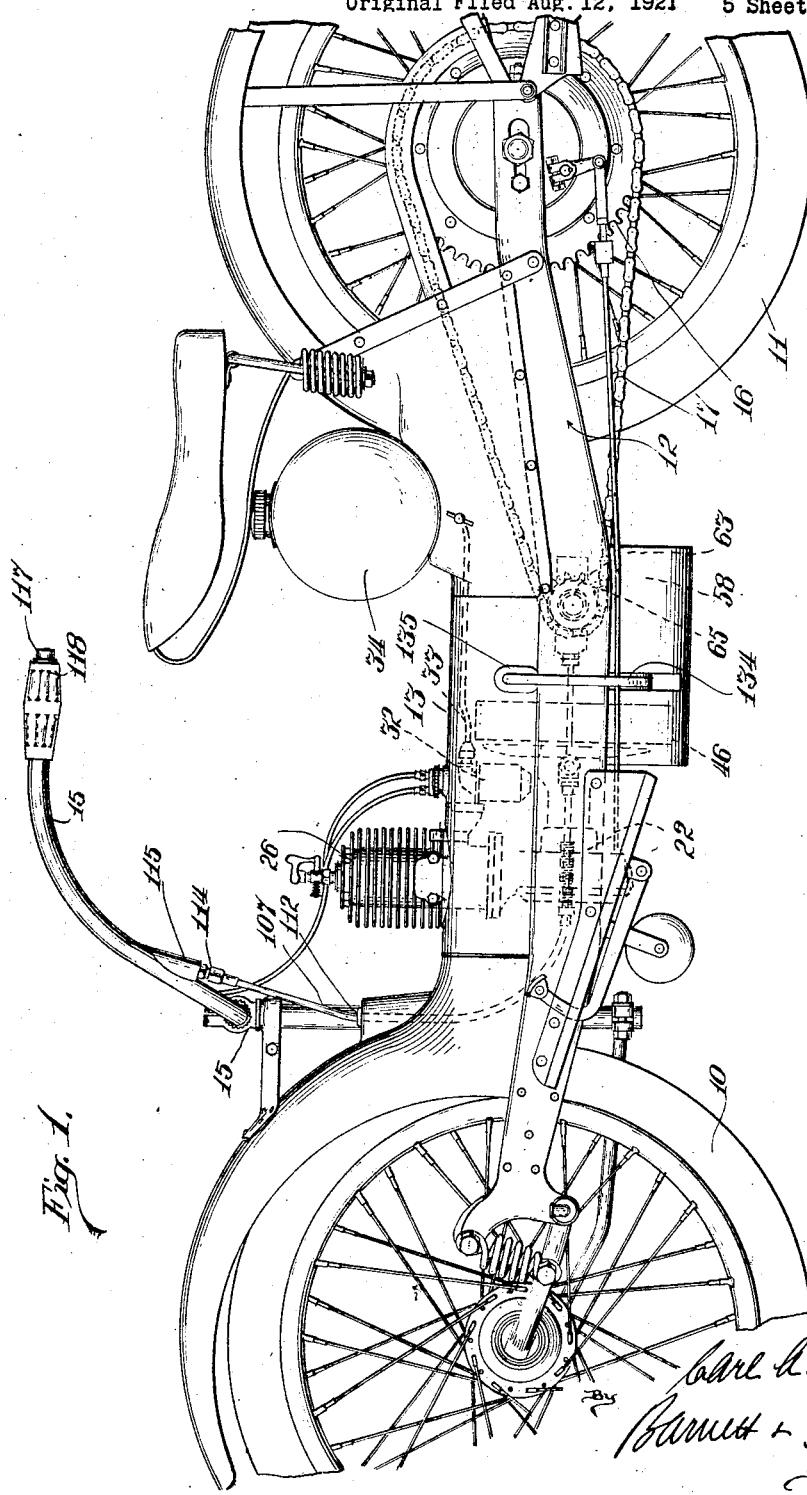

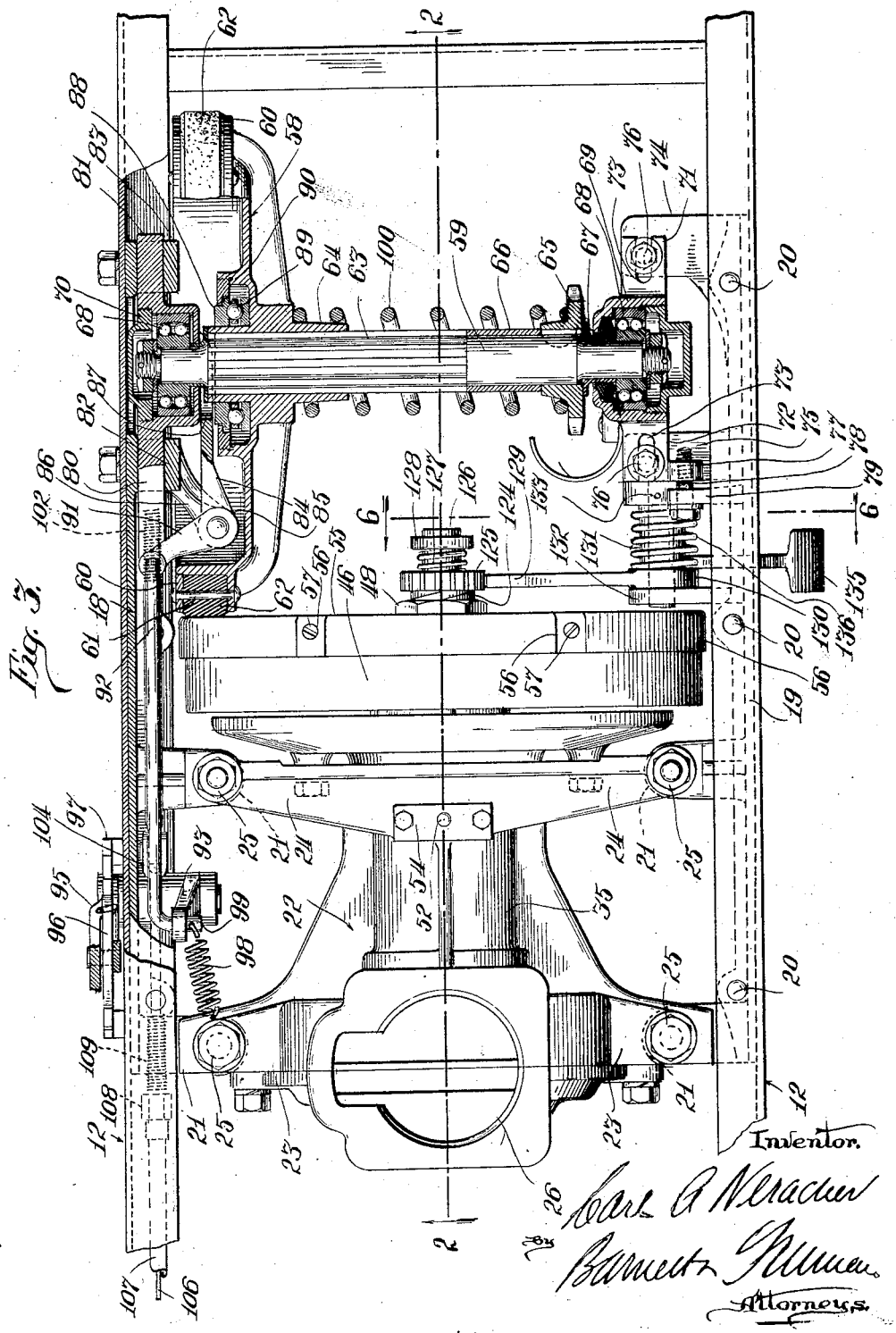

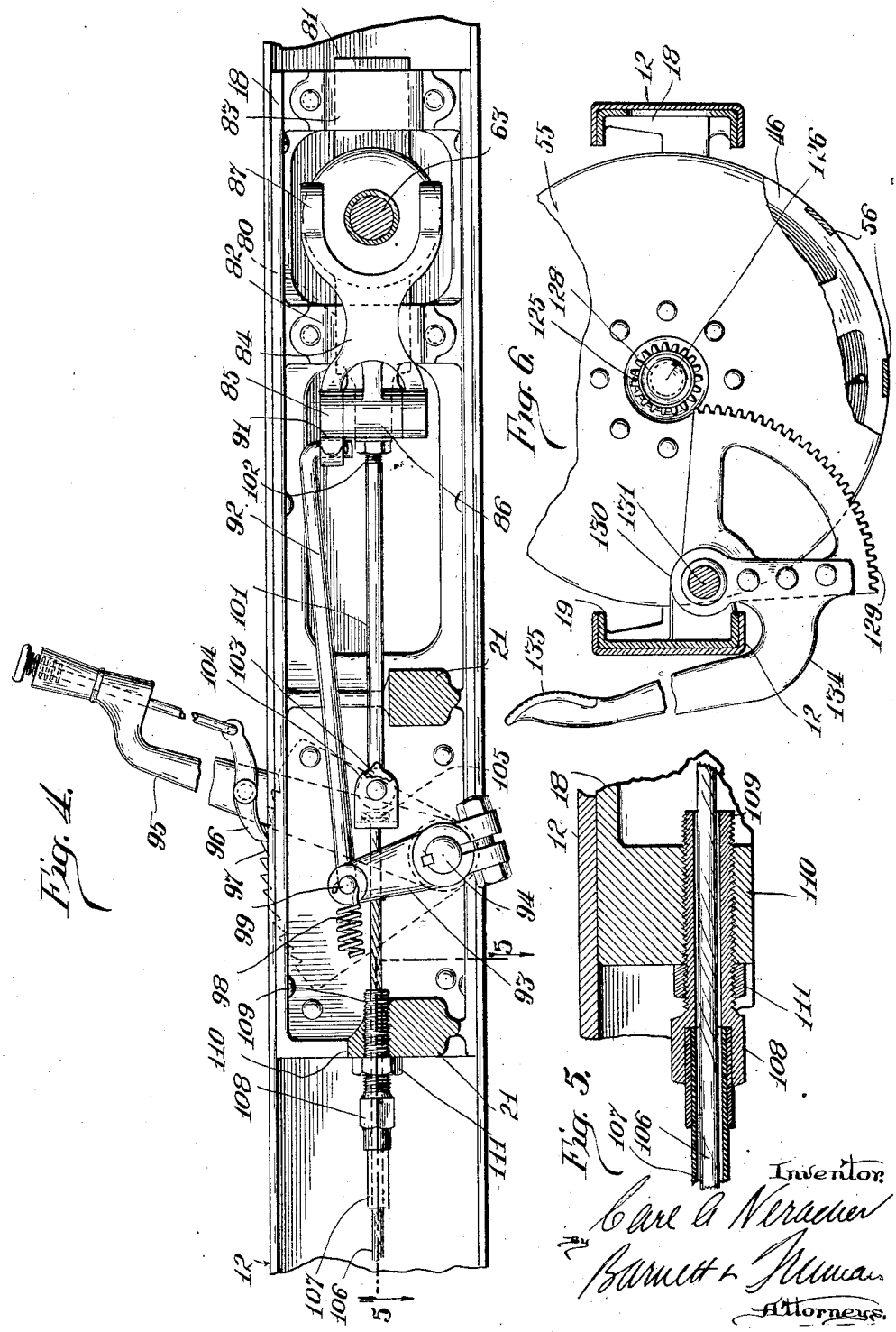

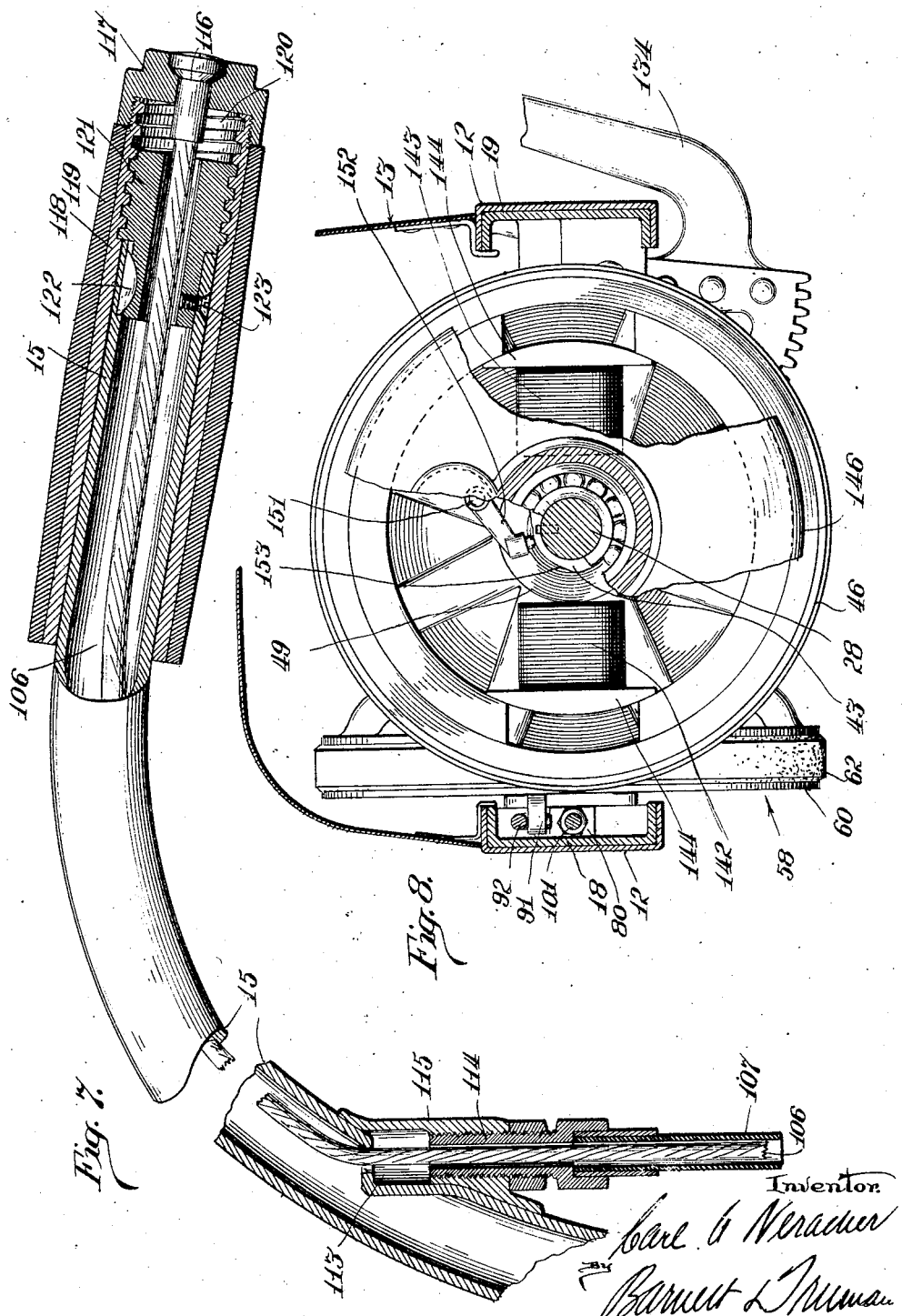

Patented Feb. 7, 1928.

1,658,137

UNITED STATES PATENT OFFICE.

CARL A. NERACHER, OF SYRACUSE, NEW YORK, ASSIGNOR TO NER-A-CAR CORPORATION, A CORPORATION OF NEW YORK.

DRIVING AND CONTROLLING MECHANISM FOR MOTOR VEHICLES.

Application filed August 12, 1921, Serial No. 491,781, and in Great Britain July 17, 1920. Renewed July 2, 1927.

My invention relates to a motor vehicle, more especially to a vehicle of the motorcycle type, and the invention is concerned with the driving means of the vehicle and the mechanisms for controlling said driving means.

The invention contemplates the employment of an internal combustion motor for developing the power required for propelling the vehicle and more especially the use of an internal combustion motor of the two-cycle type, although a four-cycle engine might be employed. The invention further contemplates the use, preferably, of a friction transmission mechanism for transmitting power from the motor to the driving wheel or wheels of the vehicle. There is a certain advantage, as will be made apparent hereinafter, in using a friction transmission mechanism, of the construction to be described, in connection with an engine of the two-cycle type.

The object, generally speaking, of the invention is to provide in a motor vehicle, and especially in a motor vehicle of the cycle type, in combination with its motor, a friction disc, transmission mechanism and controlling means therefor having certain novel and improved features, to be hereinafter described and claimed, among which may be mentioned particularly: a friction transmission in which one friction element is positively moved to and held in a low speed position with respect to the other friction element and moves automatically, through action of a spring or equivalent means, toward the high speed position when the friction elements are separated or the pressure between the same relieved, together with mechanism arranged so as to be conveniently controlled by the rider while the motorcycle is in motion for releasing the movable element at the low speed position and relieving the pressure between said elements so that the vehicle will pick up speed as the movable friction element traverses the face of the other element; the construction of the transmission mechanism so that the acceleration of speed in getting under way and also the diminution of speed in braking may be governed by controlling the pressure between the friction elements; the control of the movement of one friction element to and from the other by manipulation of a part associated with the steering mechanism of the vehicle preferably through rotation of one of the hand grips on the handle bar with which the machine is preferably provided for steering purposes; and the utilization of the fly wheel of the motor as the friction disc and the provision of said fly wheel with a removable friction member for engagement by the friction wheel. Other incidental features of novelty and improvement will be mentioned in connection with the description, which follows, of the preferred embodiment of the invention shown in the accompanying drawings. In the drawings Fig. 1 is a fragmentary side elevation of a motorcycle of the two wheel type provided with the driving and controlling mechanisms contemplated by my invention.

Fig. 2 is a fragmentary vertical sectional view taken longitudinally of the motorcycle, illustrating the motor and transmission mechanism, this view being taken on line 2—2 of Fig. 3.

Fig. 3 is a fragmentary plan view, with certain parts in section, of the parts shown in Fig. 2.

Fig. 4 is a fragmentary view in side elevation, with parts in section, illustrating the controlling devices on the right hand side of the motorcycle.

Fig. 5 is a sectional view taken on line 5—5 of Fig. 4 with the scale somewhat enlarged.

Fig. 6 is a fragmentary sectional view on line 6—6 of Fig. 3 illustrating the construction of the starting device.

Fig. 7 is a fragmentary side elevation, with parts in section, of the handle bar and the controlling devices associated with one of its hand grips, and Fig. 8 is a fragmentary sectional view taken on line 8—8 of Fig. 2.

In an application filed by me on the 27th day of June A. D. 1921. Serial No. 480,770, I have described and claimed a motorcycle chassis of the type shown herein. The present invention relates to the driving mechanisms of the motorcycle and the devices whereby such mechanisms are controlled and is not concerned, except incidentally, with the construction of the vehicle considered as a vehicle. The parts constituting the vehicle or chassis will, therefore, be described only to the extent necessary for a proper understanding of the subject matter of the invention here concerned.

Referring to the drawings, 10 designates the front or steering wheel of the motorcycle and 11 the rear or driving wheel thereof. These wheels support a frame or body comprising side frame members 12, preferably channel-shaped in cross section, and certain sheet metal parts which together provide, with said side frame members, a housing 13 that encloses, or partially encloses, the driving mechanisms of the vehicle, as shown in Fig. 1. The steering wheel 10 is controlled by a steering mechanism comprising a substantially upright steering post 14 provided with a handle bar 15. The rear wheel is shown as provided with a sprocket 16 engaged by a driving wheel 17. The invention, however, is not limited to a chain driven vehicle. Any other equivalent means may be employed for imparting movement to the driving wheel.

The motor and friction disc transmission mechanism are preferably supported between the side frame members 12. The preferred arrangement contemplates a pair of sub-frames 18 and 19 arranged within the channels of side frame members 12 and secured to said side frame members by suitable rivets 20. These sub-frames are formed with inwardly projecting lugs 21 and the crank case 22 of the motor is formed with arms 23, 23, 24, 24, resting upon and secured to the lugs 21 by bolts 25. The cylinder 26 of the motor (a one cylinder motor being preferably employed) projects through the housing 13. The motor, as shown, is a two-cycle motor having a piston 27 and a crank shaft 28, the latter being provided within crank case 22 with a cheek plate 29 to which is pivoted at 30 the piston connecting rod 31. 32 designates the carburetor of the engine which is supplied with gasoline by a fuel pipe 33 leading from the gasoline tank 34.

The crank case 22 is provided with a housing 35, preferably cast integrally with the crank case, through which housing extends the crank shaft 28. The crank shaft rotates in ball bearings 36, 36. To prevent escape of gas from the crank case, when the gas is compressed therein, a seal surrounding the crank shaft is provided which consists of an internal web 37 on housing 35, a gland 38 closely fitting the crank shaft provided with a flange 39 to bear against web 37 and a coiled spring 40 interposed between the inner raceway of the forward ball bearing 36 and flange 39. The gland 38 is formed with a slot 41 for a pin 42 driven into the crank shaft.

The fly wheel of the engine consists of a hub 43 having a tapered bore adapted to fit a tapered section 44 of the crank shaft, and a spider 45 formed with a rim portion 46. The hub 43 is keyed to the crank shaft, as shown at 47, and held from longitudinal movement on the shaft by a nut 48. 49 is a disc interposed between hub 43 and the rear ball bearing 36. 50 is a sleeve having a threaded engagement with the interior surface of housing 35 and adapted to be thrust against bearing 36. The sleeve is formed at its forward end with slots 51 adapted to be engaged by a stud 52 which extends through a slot 53 in housing 35 and is headed over on a plate 54 secured to the outside of the housing.

The fly wheel is preferably provided with a removable friction disc 55 having flanges 56 for the screws 57 attaching the disc to the rim portion 46 of the fly wheel. The friction disc 55 is adapted to be engaged by a friction wheel 58 slidably mounted on a shaft 59, wheel 58 being formed preferably with a channel-shaped rim 60 in which is secured, by rivets 61, an annular friction member 62. Shaft 59 has a splined portion 63 on which the hub 64 of wheel 58 is slidably mounted. Keyed to the other end of shaft 59 is a sprocket wheel 65 for the driving chain 17, the sprocket being held between a sleeve 66, bearing against the splined portion 63 of shaft 59, and a sleeve 67. The shaft 59 is provided at opposite ends with self aligning bearings 68, 68 carried in boxes 69, 70. The bearing box 69 is formed with ears 71, 72 provided with slots 73, 73. The ears 71, 72 rest upon projections 74, 75 formed on the sub-frame 19 and are secured thereto by clamping bolts 76 passing through slots 73. 77 is a projection on the ear 73 having a threaded perforation for an adjusting screw 78 which passes through a lug 79 on the projection 75.

The bearing box 70 at the other end of shaft 59 is formed with forwardly and rearwardly extending projections 80, 81 which are slidably arranged in guides 82, 83 secured to the sub-frame 18.

By the arrangement just described the friction wheel 58 is slidable on its shaft 59 so that it may be made to engage the friction member 55 on the fly wheel at different points between the center and perimeter of the latter; and the shaft 59, on which wheel 58 slides, may be rocked on its bearing box 69 to bring the friction ring 62 of wheel 58 into or out of contact with the friction disc on the fly wheel.

The mechanism employed for shifting friction wheel 58 on its shaft 59 is preferably the following: 84 is a bell crank having a forked portion 85 pivoted to the end of an inwardly extending bracket 86 formed on the sub-frame 18. The bell crank has a forked arm 87 which spans the end of shaft 59 and bears upon the non-rotating raceway 88 of an anti-friction thrust bearing 89 arranged within an enlargement 90 of the hub 64 of friction wheel 58. The other arm 91 of bell crank 84 is connected by a rod 92 with an arm 93 fixed to a rock shaft 94 which is mounted in the sub-frame 18 and extends through the adjacent side frame member 12 and has fixed thereto a hand lever 95 provided with a pivoted tooth 96 for engagement with a sector rack 97 on the outside of the vehicle frame. 98 is a coiled spring connecting the forward bent end 99 of rod 92 with the adjacent motor arm 23. 100 is a coiled spring interposed between the sprocket 65 and friction wheel 58. The spring acts to force wheel 58 outwardly, with respect to friction disc 55, when lever 95 is moved to the forward end of the sector rack 97.

The mechanism for moving the friction wheel 58 into and out of contact with the friction disc 55 is preferably the following: 101 is a rod threaded at 102 for engagement with the projection 80 on the bearing casing 70 at the right hand end of shaft 59. The rod 101 is formed with an eye 103 to which is pivoted a U-shaped member 104, the back of which is formed with a perforation to receive the headed end 105 of a Bowden wire 106. The casing of the Bowden wire is indicated at 107 (Figs. 4 and 5) and fits into the end of an adjusting sleeve 108 having a portion 109 in threaded engagement with a lug 110 on the sub-frame 18. 111 is a lock nut to maintain the adjustment. The Bowden wire passing through an opening 112 in the housing 13 (Fig. 1) parallels the steering post 14 and enters the handle bar 15 through an opening 113 therein (Fig. 7), the outer casing 107 of the wire abutting against an adjusting sleeve 114 screwed into a fitting 115 secured to the handle bar over opening 113. While I have shown an adjusting sleeve at each end of the Bowden wire, a single adjustment is all that is required. The wire 106 has secured to the outer end thereof a head 116 which has a loose fit with a cap piece 117 secured on the end of a metal sleeve 118 to which the handle grip 119 is cemented or otherwise fastened. The sleeve 118 is internally threaded, as indicated at 120, for engagement with a hollow stud 121 fixed to the end of the handle bar 15 by a key 122 and screw 123.

The vehicle is provided with a kick starter preferably constructed as follows: The nut 48 on the end of crank shaft 28 is formed with clutch teeth 124 engaged by corresponding clutch teeth formed on a pinion 125 loosely mounted on the extremity 126 of the crank shaft, a coiled spring 127 being interposed between a collar 128 on the projecting portion 126 of the crank shaft and pinion 125 to maintain engagement between the pinion and the fixed clutch member. 129 is a sector gear having a hub 130 revolubly mounted on a short shaft 131 supported by the projection 75 on sub-frame 19 and a parallel projection 132 inwardly extending from the sub-frame, the shaft 131 being secured to projection 75 by a pin 133. Secured to the sector gear 129 is a lever 134, the upper end of which is formed with a foot piece 135. A coiled spring 136, one end of which is anchored in the sector gear and the other in sub-frame 19 tends to keep the lever 134 in its upright position with sector gear 129 out of mesh with pinion 125, as shown in Fig. 6.

Associated with the fly wheel of the motor is a magneto generator which generates an ignition current for the motor and also, preferably, a separate current for supplying the electric lamps with which the vehicle is provided. The generator is preferably constructed as follows: 140 is a permanent magnet fixed to the rim 46 of the fly wheel and provided with pole pieces 141 of laminated construction. The armature consists of two coils 142, 143, one for the ignition current and the other for the lighting current, each coil having a pole shoe 144. The windings are carried on a plate 145 secured to a disc 146 formed with a hub 147 adapted to bear on a finished portion 148 on the housing 35 and against a boss 149 formed thereon. The circuit breaker for the ignition circuit is enclosed in a box 150 secured to the front face of disc 146. This mechanism comprises a rock shaft 151 provided with an arm 152, the end of which travels in a camway 153 formed in the hub 43 of the fly wheel. The disc 146 is capable of a limited rotation for timing the spark. It will be observed that since disc 146 carries the armature windings and also the breaker mechanism for the ignition circuit, so that an adjustment of the disc to advance or retard the spark involves a corresponding movement of the armature windings, a proper relation is always maintained between armature and field at the time the spark is produced.

Operation: In starting the motor the rider straddles the machine, puts his left foot on the foot piece 135 of the starting lever 134 and by pressing down on the starting lever, causes the sector gear 129 to engage with the pinion 125 on the crank shaft. This pinion being engaged with the fixed clutch member 48, the motor is turned over. When the engine fires the inclination of the clutch teeth faces allows the crank shaft to run free of the starting mechanism. As soon as the starting lever is released spring 136 returns the sector gear to its normal position out of engagement with pinion 125 which may now turn with the crank shaft.

To set the transmission for low speed, as will ordinarily be done in starting, the rider pulls lever 95 backwardly, the bell crank 84 engages friction wheel 58 and moves the same inwardly on the splined portion 63 of shaft 59. Sector rack 97 being provided with a plurality of teeth, a considerable variation in speed, either in starting or afterwards, is permitted.

The rider may then turn the hand grip 119 producing a pull on wire 106 which draws the friction wheel 58 against friction disc 55, the bearings 68 of shaft 59 adjusting themselves to the change in angular position of the shaft. When the machine is under way the speed may be increased by manipulation of lever 95. For example, the rider moves the lever 95 either to the high speed position at the left hand side of sector rack 97 (Fig. 4) and then relieves the pressure of the friction wheel on the friction disc by turning the hand grip 119 in the direction to slack wire 106. The friction wheel will now move across the disc, either to the high speed position or to some intermediate position, depending upon the setting of lever 95. Ordinarily the driving contact between the wheel and disc is not completely broken but the pressure is relieved just enough to allow the movement of the wheel radially of the disc so that the acceleration is to a certain extent gradual, that is, in passing from low speed to high speed the vehicle is driven at all the intermediate speeds. This relieves the motor from the stresses due to suddenly increased loads and makes the operation of the machine much smoother. Furthermore, the radial movement of the friction wheel will be retarded, if not entirely stopped, if the pressure between the friction element is maintained at the normal driving pressure, so that after setting the shift lever to the higher speed position the rider may, if circumstances make it desirable, hold the speed of the motorcycle down by not relieving the pressure between the friction elements until conditions are favorable for running at the higher speed. The rate of acceleration from low speed to high speed may be similarly governed by varying the pressure between the friction elements. The control of the machine in the respects noted is accomplished while the rider has both hands on the handle bars and by merely a slight rotation one way or the other of one of the hand grips. This is a feature of considerable importance when the machine is operated on a crowded street or over a road which is not uniformly good. The rider may govern the speed, to a considerable extent at least, without interference with the steering of the machine and in accordance with the performance of the motor. Thus if the motor begins to labor the acceleration may be stopped or slowed down. The motor may at any time be instantaneously disengaged from the driving wheel 11 of the motorcycle by turning hand grip 119 in the direction to slack wire 106. As this involves simply turning one hand grip power can be cut off from the driving wheel in an emergency without the slightest interference with the steering of the vehicle; or in case of threatened danger the rider may relieve the pressure between the friction wheel and disc just enough to slow down the speed. This facility of the control which, with a little practice becomes instinctive, reduces to a minimum the risk of accident. The fact that the pressure between the friction elements is under the control of the driver and may be increased to practically any extent, makes it possible to use the transmission apparatus for braking the vehicle, the apparatus, therefore, providing the vehicle with a second brake, which is required by law in some jurisdictions and is desirable always because of the possibility of the usual service brakes getting out of order. By shutting off fuel to the motor or throttling the same the force of inertia of the vehicle may be transmitted to the motor which, therefore, acts as a brake. This braking action is under the direct control of the driver and may be varied so as to slow down the speed of the vehicle as may be desired and so as to maintain the low speed (on a long grade, for instance) by varying the pressure of the friction wheel against the disc and the position of the wheel with respect to the center of the disc. When considerable pressure exists between the friction elements their engagement in itself has a braking function.

A motorcycle, or other similar motor driven vehicle, when provided with controlling devices such as described, can be operated very conveniently and safely. While these controlling devices may be used in connection with a motor of the four-cycle type they are especially advantageous when the vehicle is equipped with a two-cycle engine since the two-cycle engine loses power more rapidly, as the speed of the motor diminishes under an excessive load, than a four-cycle engine, so that with a two cycle motor a change speed device that may be quickly and conveniently actuated is a matter of considerable importance. For example, suppose the motorcycle encounters a heavy piece of road and the engine begins to labor, the rider, with his left hand, turns hand grip 119 to release the pressure of one friction element on the other and with his right hand, shifts the change speed lever 95 to the extent required, whereupon the hand grip is again turned to bring the discs into operative contact. With very little practice this operation may be performed very quickly and with but little effort. The threads on elements 118 and 121 hold the movable element 118 with its hand grip at any position to which it may be turned against the pull of the wire 106. The threaded engagement of the hand grip on the handle bar permits adjustment of the pressure between the friction wheel and disc by infinitesimal gradations. This mechanism constitutes the only means for effecting the driving contact between wheel and disc. No pressure sufficient to transmit driving force from one to the other exists except as it is created through turning of the hand grip. Slack in the controlling wire 106, due to wear of the friction discs, may be taken up by adjustment of one of the adjusting sleeves 108 or 114. When wear on the discs requires it, the left hand bearing of shaft 59 may be adjusted toward the fly wheel by loosening screws 76 and drawing up the adjusting screw 78.

This application is a continuation in part of my copending application filed March 26, 1920, as Serial No. 368,963.

I claim:

1. In a motor driven vehicle having a traction wheel, a friction transmission mechanism comprising coengageable friction elements, one of which is at right angles with the surface of the other which it engages, a controlling device under the control of the driver of the vehicle while driving the same, for varying the pressure between said elements by infinitesimal gradations which may be set to hold said elements in any relative position to which they may be adjusted and a controlling device also under control of the driver when driving the vehicle for moving one of said friction elements along a line parallel to the friction surface of the other to vary the speed of the vehicle.

2. The combination with a motor driven vehicle and an internal combustion motor for driving the same, of a transmission and controlling mechanism comprising a friction disc fixed to the crank shaft of the motor, a shaft substantially parallel with said disc, a friction wheel slidable and non-rotatable on said shaft, and means for setting said friction wheel to different positions on said shaft comprising a rocking member bearing against the wheel without attachment thereto so that it can move the wheel in one direction only and can then be moved to a position remote from the wheel, a rocking member on the vehicle frame, and a rod connecting said rocking members.

3. The combination with a motor driven vehicle and an internal combustion motor for driving the same, of a transmission and controlling mechanism comprising a friction disc fixed to the crank shaft of the motor, a shaft substantially parallel with said disc, a friction wheel slidable and non-rotatable on said shaft, means for setting said friction wheel to different positions on said shaft comprising a rocking member bearing against the wheel without attachment thereto so that it can move the wheel in one direction only and can then be moved to a position remote from the wheel, a rocking member on the vehicle frame, a rod connecting said rocking members, and a spring which tends to move the slidable wheel to a position near the periphery of the disc.

4. The combination with a motor driven vehicle and an internal combustion motor for driving the same, of a transmission and controlling mechanism comprising a friction disc fixed to the crank shaft of the motor, a shaft substantially parallel with said disc, a friction wheel slidable and non-rotatable on said shaft, means for setting said friction wheel to different positions on said shaft comprising a rocking member bearing against the wheel without attachment thereto so that it can move the wheel in one direction only and can then be moved to a position remote from the wheel, a rocking member on the vehicle frame, a rod connecting said rocking members, a spring which tends to move the slidable wheel to a position near the periphery of the disc, and a spring which tends to return the rocking devices to their normal positions.

5. The combination with a motor driven vehicle and its motor, of a transmission and controlling mechanism for the same comprising a friction disc driven by the motor, a shaft substantially parallel therewith provided with bearings allowing one end of the shaft to be moved to and away from said disc, a friction wheel slidable and non-rotatable on said shaft, a spring which tends to hold the slidable wheel at one end of the shaft, means bearing against the slidable wheel without engagement therewith for moving the slidable wheel in one direction only to different positions on said shaft, and means for moving the shaft to bring the wheel thereon into contact with the disc.

6. In combination with a motor driven vehicle and an internal combustion motor for driving the same, a fly wheel associated with said motor, a shaft substantially parallel with the fly wheel, self aligning bearings for said shaft, a box for one of said bearings adapted to be fixed to the vehicle frame, a slidable box for the other bearing, a friction wheel slidably and non-rotatably mounted on said shaft, means for moving said friction wheel into contact with the fly wheel, a rocking device which bears against one side of the friction wheel and can be retracted therefrom for moving said friction wheel toward the center of the fly wheel, and a spring which tends to force said friction wheel toward the periphery of the fly wheel.

7. In a motor driven vehicle, a friction transmission comprising coengageable friction elements comprising a disc having a flat friction surface, a wheel to bear against said surface controlling mechanism for adjusting the pressure between said elements by infinitesimal gradations, comprising a hand grip and a member with which said hand grip has a worm threaded engagement that holds the hand grip in any position of adjustment against stress between the friction elements and a member under control of the driver of the vehicle while driving it for moving one of said friction elements with respect to the other to vary the speed of the vehicle.

8. In a motorcycle, the combination of a driving wheel, a frame, a handle bar, a motor mounted on the frame, a transmission mechanism for applying the power of the motor to said driving wheel comprising a pair of friction elements, means for moving one element into contact with the other with variable pressures, comprising a hand grip having a worm thread engagement with said handle bar, and means for shifting one of said friction elements with respect to the other to vary the speed of the vehicle comprising a lever mounted on said frame.

9. In combination with the motor of a vehicle of the motorcycle type, mechanism for transmitting power from the motor to the traction wheel of the vehicle comprising a friction disc, a friction wheel movable automatically across the face of the disc from the low speed position toward the high speed position, a member to move said wheel to said low speed position which may be set independently of the wheel to stop the wheel for a higher speed position, and means controllable by the driver for producing a variable pressure between said wheel and disc.

10. In combination with the motor of a vehicle of the motorcycle type, mechanism for transmitting power from the motor to the traction wheel of the vehicle comprising a friction disc driven by the motor, a friction wheel having a driving connection with the friction wheel of the vehicle and movable automatically across the face of the disc from the low to the high speed position, a member to move said friction wheel to said low speed position which may be withdrawn therefrom to allow said automatic movement of the friction wheel, and means controllable by the driver for producing a variable pressure between said wheel and disc.

11. In combination with the motor of a vehicle of the motorcycle type, mechanism for transmitting power from the motor to the traction wheel of the vehicle, comprising a friction disc forming part of the fly wheel of the motor, a friction wheel movable automatically across the face of the disc from the low to the high speed position, a member to move said wheel to said low speed position which may be withdrawn therefrom to permit said automatic movement of the wheel, and means controllable by the driver for producing a variable pressure between said wheel and disc.

12. In combination with the motor of a vehicle of the motorcycle type, mechanism for transmitting power from the motor to the traction wheel of the vehicle comprising a friction disc, a friction wheel, a driven shaft on which said wheel is movable longitudinally, means for mounting said shaft so that it has angular movement toward and away from said disc, a member for moving the wheel along the shaft to the low speed position which may be set independently of the wheel to stop the wheel at a higher speed position, the wheel being movable automatically from the low to the high speed position, and means controllable by the driver for producing a variable pressure between said disc and wheel.

13. In combination with the frame and motor of a vehicle of the motorcycle type, a disc driven by the motor, a shaft substantially parallel with the disc mounted so as to have angular movement to and from the same, a friction wheel mounted non-rotatably on said shaft and movable automatically from a low speed to a high speed position, means controllable by the driver for drawing said wheel against said disc, and a member retractable from the wheel which may be brought to bear against said wheel for forcing it to the low speed position.

14. In combination with the frame and motor of a vehicle of the motorcycle type, a disc driven by the motor, a shaft substantially parallel with the disc mounted so as to have angular movement to and from the same, a friction wheel splined on said shaft, means controllable by the driver for drawing said wheel against said disc, a member which bears against said wheel for forcing it to the low speed position, the wheel being free to move to a higher speed position when said member is withdrawn therefrom, and a spring which tends to force said wheel to the high speed position.

15. In combination with the frame and motor of a vehicle of the motorcycle type, a disc driven by the motor, a shaft substantially parallel with the disc, a slide on which one end of said shaft is mounted, means for moving the slide toward the disc, a friction wheel splined on said shaft, a member retractable from the wheel which may be brought to bear upon the same wheel to force it to the low speed position, a spring tending to return the wheel to the high speed position, and means controllable by the driver for drawing said wheel against the disc.

16. In combination with the frame and motor of a vehicle of the motorcycle type, a disc driven by the motor, a shaft substantially parallel with the disc mounted so as to have an angular movement to and from the same, a friction wheel mounted non-rotatably on said shaft and movable automatically from a low speed to a high speed position, means controllable by the driver for drawing said wheel against said disc, and a bell crank on the frame having a forked end straddling said shaft and bearing against without attachment to the wheel to force the same to the low speed position.

17. In combination with the frame and motor of a vehicle of the motorcycle type, a disc driven by the motor, a shaft substantially parallel with the disc mounted so as to have an angular movement to and from the same, a friction wheel mounted non-rotatably on said shaft and movable automatically from a low speed to a high speed position, means controllable by the driver for drawing said wheel against said disc, a bell crank on the frame having a forked end straddling said shaft and bearing against without attachment to the wheel to force the same to the low speed position, and means adapted to be set to hold the bell crank for positioning the wheel either for low speed, high speed or an intermediate speed.

18. In combination with the frame and motor of a vehicle of the motorcycle type, a disc driven by the motor, a shaft substantially parallel with the disc mounted so as to have an angular movement to and from the same, a friction wheel splined on said shaft, means controllable by the driver for drawing said wheel against said disc, a bell crank on the frame having a forked end straddling said shaft and bearing against without attachment to the wheel to force the same to the low speed position, and a spring which tends to force the wheel to the high speed position.

19. In combination with the motor of a vehicle of the motorcycle type, mechanism for transmitting power from the motor to the traction wheel of the vehicle comprising a friction disc, a friction wheel, a driven shaft on which said wheel is movable longitudinally, a spring to move the wheel to the high speed position, a member for moving the wheel to the low speed position, and means with the control of the driver while driving the vehicle for forcing the wheel against the disc with variable pressure.

20. In a motor driven vehicle, a friction transmission comprising coengageable friction elements one of which is movable automatically from low speed to high speed position on the other, means within the control of the operator of the vehicle for adjusting the pressure between said elements by infinitesimal gradations, and means, also within the control of the operator of the vehicle while driving said vehicle for moving one of said friction elements from a high speed to a low speed position on the other.

21. A friction gearing for motorcycles and the like, comprising a pair of coacting friction elements one of which is movable across the other to vary the speed ratio between the same, a member which bears against the movable element to force the same to and hold the same in the low speed position, said element being automatically movable, when released by said member, toward the high speed position, and means controllable by the operator for producing a driving pressure between said elements which may be decreased to allow the movable element to move toward the high speed position, controllably, without interrupting the driving relation between said elements.

22. In a motorcycle, the combination of a traction wheel, a motor and mechanism for transmitting power from the motor to the traction wheel comprising a pair of coacting friction elements, means for shifting one of said elements to a low speed position, means for creating a driving pressure between said elements, and means operating when said pressure is relieved for moving the movable friction element in the direction to increase the speed of the motorcycle.

23. In a motorcycle, the combination of a traction wheel, a motor and mechanism for transmitting power from the motor to the traction wheel comprising a pair of coacting friction elements, a member for shifting one of said elements to a low speed position which is movable independently of said element to stop said element at a higher speed position, means for creating a driving pressure between said elements, and means operating when said pressure is relieved for moving said movable friction element in the direction to increase the speed of the motorcycle.

24. In a motorcycle, the combination of a traction wheel, a motor and mechanism for transmitting power from the motor to the traction wheel, comprising a pair of coacting friction elements, one of which is automatically movable from low to high speed positions, means for shifting said last named friction element to a low speed position, and means for creating a driving pressure between said elements and for relieving said pressure to allow movement of said movable friction element in the direction to increase the speed of the motorcycle.

25. In a motorcycle, the combination of a traction wheel, a motor and mechanism for transmitting power from the motor to the traction wheel, comprising a pair of coacting friction elements, one of which is automatically movable from low to high speed positions, a member for moving said last named friction element to a low speed position, which member is movable to stop said element at a higher speed position, and means for creating a driving pressure between said elements and for relieving said pressure to allow movement of the movable friction element in the direction to increase the speed of the motorcycle.

26. In combination with the steering member, traction wheel and motor of a motorcycle, mechanism for transmitting power from the motor to the traction wheel comprising a pair of coacting friction elements one of which is movable automatically from low to high speed positions, means for moving said last named friction element to a low speed position, and means associated with said steering member for creating a driving pressure between said friction elements and for relieving said pressure to allow the movement of said movable friction element in the direction to increase the speed of the motorcycle.

27. In combination with the steering member, traction wheel and motor of a motorcycle, mechanism for transmitting power from the motor to the traction wheel, comprising a pair of coacting friction elements, one of which is movable automatically from low to high speed positions, including a device arranged on said steering member so as to be manipulatable by the rider while steering the motorcycle for creating a driving pressure between said friction elements and for relieving said pressure to allow the movement of said movable friction element in the direction to increase the speed of the motorcycle.

28. In combination with the steering member, traction wheel and motor of a motorcycle, mechanism for transmitting power from the motor to the traction wheel comprising a pair of coacting friction elements, one of which is movable automatically from low to high speed positions including a hand grip arranged on said steering member manipulatable by the rider while steering the motorcycle for creating a driving pressure between said friction elements and for relieving said pressure to allow the movement of said movable friction element in the direction to increase the speed of the motorcycle.

29. In a motor driven vehicle, a friction transmission comprising coengageable friction elements, one of which is movable automatically from low speed to high speed position on the other, means for adjusting the pressure between said elements by infinitesimal gradations comprising a hand grip and a member with which said hand grip has a worm threaded engagement which holds the hand grip in any adjusted position against stress between the friction elements, and means controllable by the operator of the vehicle for moving one of said frictional elements from a high speed to a low speed position on the other.

30. In combination with the steering member, traction wheel and motor of a motorcycle, mechanism for transmitting power from the motor to the traction wheel comprising a pair of coacting friction members, one of which is movable automatically across the other from the low speed to the high speed position without breaking the driving contact between said elements when the pressure between said elements is relieved, means for moving said movable friction element to a low speed position, and means for moving said elements into and out of contact with each other and for varying the pressure between the same.

31. In combination with the steering member, traction wheel and motor of a motorcycle, mechanism for transmitting power from the motor to the traction wheel comprising a pair of coacting friction elements, one of which is movable automatically from low to high speed positions, means including a shift lever and a member operated thereby and engaging said movable friction element for moving the same to a low speed position and for stopping the movement thereof at a higher speed position, and means associated with said steering member for creating a driving pressure between said friction elements and for relieving said pressure to allow the movable friction element to move in the direction to increase the speed of the motorcycle.

32. A friction transmission mechanism comprising, in combination, coengageable friction elements, one of which is automatically movable from the low to the high speed position with respect to the other, releasable means for positively moving the movable one of said elements to the low speed position, and releasable means within the control of the driver of the vehicle while driving for pressing one of said elements against the other with regulatable pressure.

33. A friction transmission mechanism comprising, in combination, coengageable friction elements, one of which is automatically movable from the low to the high speed position with respect to the other, releasable means for positively moving the movable one of said elements to the low speed position, and releasable means whereby the operator may pull one of said elements into contact with the other.

34. A friction transmission mechanism comprising, in combination, coengageable friction elements, one of which is automatically movable from the low to the high speed position with respect to the other, releasable means for positively moving the movable one of said elements to the low speed position, releasable means whereby the operator may pull one of said elements into contact with the other, comprising a flexible member, and means for taking up slack in said flexible member.

35. A friction transmission mechanism comprising, in combination, a disc, a wheel, a shaft on which the wheel is slidably and non-rotatably mounted, a spring which moves the wheel to the high speed position with respect to the disc, a member which is adapted to bear against the wheel and move the same in the other direction, and means adapted to act on said shaft to force the wheel against the disc.

36. A friction transmission mechanism comprising, in combination, a disc, a wheel, a shaft on which the wheel is slidably and non-rotatably mounted, a spring which moves the wheel from the low speed position on the disc to a high speed position thereon, a member which is adapted to bear against the wheel and move the same in the other direction, a flexible element connected with said shaft for forcing the wheel into contact with the disc, and a manually operable means for taking up slack in said flexible element comprising two members having a worm threaded engagement with each other which holds them in any adjusted position against the stress created between said friction elements.

37. In a motorcycle having a traction wheel, a motor and a steering member provided with a revoluble hand grip; a pair of friction transmission elements one of which is operatively connected with said traction wheel and the other with the motor, means operated by turning said revoluble hand grip for controlling the pressure between said friction elements, releasable means for shifting one of said friction elements from the high speed to the low speed position relative to the other, and means which operates automatically to shift said friction element, when so released, from the low speed to the high speed position.

38. In combination with a motorcycle having a motor, a traction wheel and a handle bar, a friction disc on the motor shaft, a friction wheel operatively connected with the traction wheel, a hand grip on the handle bar having a worm threaded engagement therewith, a flexible member connected with said hand grip and with the friction wheel for drawing the wheel with variable pressures against the disc, a spring which tends to move the friction wheel toward the edge of the disc, and means for moving the friction wheel toward the center of the disc which is retractable from the wheel so that it may be withdrawn therefrom to stop the wheel when, under the action of the spring, the wheel moves toward the edge of the disc.

39. In combination with a motorcycle having a motor, a traction wheel and a handle bar, a friction disc on the motor shaft, a friction wheel operatively connected with the traction wheel, a hand grip on the handle bar having a worm threaded engagement therewith, a flexible member connected with said hand grip and with the friction wheel for drawing the wheel with variable pressures against the disc, a spring which tends to move the friction wheel toward the edge of the disc, and means for moving the friction wheel toward the center of the disc which is retractable from the wheel so that it may be withdrawn therefrom to stop the wheel when, under the action of the spring, the wheel moves toward the edge of the disc, said means comprising a lever and a quadrant for fixing the position of the lever.

CARL A. NERACHER.